United States Patent [19]

Nemirovsky et al.

[11] Patent Number: 5,253,161
[45] Date of Patent: Oct. 12, 1993

[54] METHOD FOR ROUTING DATA IN A NEAR-OPTIMAL MANNER IN A DISTRIBUTED DATA COMMUNICATIONS NETWORK

[76] Inventors: Paul Nemirovsky, 3 Bouldercrest Ct., Rockville, Md. 20850; Michael Ball, 1012 S. Mansion Dr., Silver Spring, Md. 20770; Michael Post, 24 Lexington Rd., New York, N.Y. 10956

[21] Appl. No.: 475,872

[22] Filed: Feb. 6, 1990

[51] Int. Cl.$^5$ .......................... G06F 15/20; H04J 3/24; H04Q 11/04; H04Q 11/00
[52] U.S. Cl. .................................. 364/402; 370/94.1; 370/60; 370/53
[58] Field of Search ...................... 364/401, 402, 408; 370/16, 94.1, 17, 60

[56] References Cited

U.S. PATENT DOCUMENTS 4,081,612 3/1978 Hafner .................................. 370/60
4,974,224 11/1990 Boone ................................. 370/94.1

Primary Examiner—Roy N. Envall, Jr.
Assistant Examiner—Khai Tran
Attorney, Agent, or Firm—Kenyon & Kenyon

[57] ABSTRACT

A method to produce near-optimal routes for the flow of data between clusters in a distributed data communications network. A backbone traffic matrix and a backbone topology at the cluster level are used to produce minimum hop routes, minimum delay routes, or routes which maximize throughput. The inputs of the system are the number of requirements, the number of backbone links, and the number of backbone nodes.

14 Claims, 6 Drawing Sheets

FIG.4

BACKBONE LINKS/CHANNELS — v2.1

| SOURCE | DESTINATION | | | SPEED | # OF | TOTAL | |
|---|---|---|---|---|---|---|---|
| Loc ID Dev Node # | Loc ID Dev Node # | Chos? | Link ID | (Kb/SEC) | LINES | UTIL | COST $ |
| CALANG BB | CAOAKL BB | Y | ATT | 56 | 1 | .17 | 1985.68 |
| CALANG BB | COAURO BB | Y | ATT | 56 | 1 | .11 | 3220.75 |
| CALANG BB | NJTREN BB | Y | ATT | 56 | 1 | .21 | 6059.73 |
| CALANG BB | OHCINC BB | N | ATT | 56 | 0 | 0 | 4818.88 |
| CAOAKL BB | COAURO BB | N | ATT | 56 | 0 | 0 | 3406.89 |
| CAOAKL BB | NJTREN BB | N | ATT | 56 | 0 | 0 | 6264.95 |
| CAOAKL BB | OHCINC BB | Y | ATT | 56 | 1 | .12 | 5052.33 |

T1 BACKBONE LINKS/CHANNELS — v2.1

| SOURCE | DESTINATION | | | SPEED | # OF | TOTAL | |
|---|---|---|---|---|---|---|---|
| Loc ID Dev Node # | Loc ID Dev Node # | Chos? | Link ID | (Kb/SEC) | LINES | UTIL | COST $ |

DESIGN LINK TABLE: PAGEDOWN KEY

COUNT: 7

CHAR MODE: REPLACE PAGE 1

FIG. 5

ROUTING INFORMATION — v2.0

| ROUTE ID # | FROM LOCATION | DEVICE ID | TO LOCATION | DEVICE ID | TRAFFIC |
|---|---|---|---|---|---|
| 0 | NJTREN | BB | OHCINC | BB | 20.12 |
| 1 | NJTREN | BB | COAURO | BB | 2.54 |
| 2 | NJTREN | BB | CAOAKL | BB | 6.39 |
| 3 | NJTREN | BB | CALANG | BB | 2.95 |
| 4 | OHCINC | BB | NJTREN | BB | 8.37 |

INFORMATION ON ROUTES — v2.0

| ROUTE ID# | ORDER NUMBER | FROM LOCATION | DEVICE ID | TO LOCATION | DEVICE ID |
|---|---|---|---|---|---|
| 1 | 1 | NJTREN | BB | CALANG | BB |
| 1 | 2 | CALANG | BB | COAURO | BB |

> CHAR MODE: REPLACE PAGE 1     COUNT: 11

| SOURCE | | | DESTINATION | | | BACKBONE END TO END DELAY —— v2.1 | |
|---|---|---|---|---|---|---|---|
| LOCATION | DEVICE | NODE # | LOCATION | DEVICE | NODE # | DELAY (SECONDS) | AVAIL |
| OHCINC | BB | 1 | CAOAKL | BB | 3 | .01262 | .9996 |
| COAURO | BB | 2 | CALANG | BB | 4 | .01271 | .9996 |
| OHCINC | BB | 1 | COAURO | BB | 2 | .01276 | .9996 |
| CAOAKL | BB | 3 | CALANG | BB | 4 | .01282 | .9996 |
| CALANG | BB | 4 | COAURO | BB | 2 | .01308 | .9996 |
| CAOAKL | BB | 3 | OHCINC | BB | 1 | .01328 | .9996 |
| CALANG | BB | 4 | CAOAKL | BB | 3 | .01379 | .9996 |
| COAURO | BB | 2 | OHCINC | BB | 1 | .0138 | .9996 |
| OHCINC | BB | 1 | NJTREN | BB | 0 | .01394 | .9996 |
| CALANG | BB | 4 | NJTREN | BB | 0 | .01429 | .9996 |
| NJTREN | BB | 0 | CALANG | BB | 4 | .01455 | .9996 |
| NJTREN | BB | 0 | OHCINC | BB | 1 | .01738 | .9996 |
| OHCINC | BB | 1 | CALANG | BB | 4 | .02334 | .999938 |
| CAOAKL | BB | 3 | COAURO | BB | 2 | .02384 | .998432 |
| COAURO | BB | 2 | CAOAKL | BB | 3 | .02429 | .998432 |
| CALANG | BB | 4 | OHCINC | BB | 1 | .02473 | .999938 |
| COAURO | BB | 2 | NJTREN | BB | 0 | .0248 | .998432 |
| CAOAKL | BB | 3 | NJTREN | BB | 0 | .02487 | .998432 |

CHAR MODE: REPLACE   PAGE 1                    COUNT: 18

FIG.6

METHOD FOR ROUTING DATA IN A NEAR-OPTIMAL MANNER IN A DISTRIBUTED DATA COMMUNICATIONS NETWORK

TECHNICAL FIELD

This invention relates generally to distributed data communications networks, and more particularly, to a method that produces near-optimal routes for the flow of data in a distributed data communications network.

BACKGROUND OF THE INVENTION

A basic function of a distributed data communications network is to transmit data between any two points in the network. The routing of this data should be accomplished in the most efficient manner possible. A distributed data communications network is a hierarchical system of hardware components arranged so that each hardware device is connected, directly or indirectly, to every other device. At the lowest level are user terminals or hosts, which form part of the local access network. These terminals are linked to one or more concentrators, which are statistical multiplexers with several low data rate output data lines and a fewer number of high data rate output data lines. The concentrators form the second level of the hierarchy and, together with the terminals, form the access network.

The concentrators, which may be connected to other concentrators in a hierarchical fashion, are ultimately connected to the backbone, which forms the highest level in the hierarchy. The backbone consists of high speed, high capacity links that terminate at backbone nodes. A backbone node consists of one or more devices, and includes at least one switching device for routing traffic within the backbone. The traffic is the quantity of data per unit time that is transmitted through the lines. The traffic from the concentrators enters the backbone at a backbone node.

A collection of terminals and associated concentrators are aggregated into a cluster along with one or more switches at a single backbone node. More than one cluster may be associated with a single backbone node, since there may be a plurality of switches at each backbone node location.

SUMMARY OF THE INVENTION

The present invention is directed to a method and apparatus used to produce near-optimal routes for the flow of data between clusters in a distributed data communications network which overcomes the limitations of the prior art. More specifically, the invention is composed of an interactive personal computer-based software tool that uses a backbone traffic matrix and a backbone topology at the cluster level to produce minimum hop routes, minimum delay routes, or routes which maximize throughput. A route is made up of a series of physical links. These routes are the path taken by the traffic between a source backbone node and a destination backbone node. The throughput and delay of the traffic being transmitted between the source and the destination are the two main performance characteristics of a routing method.

The inputs used by this system are the number of requirements, the number of backbone links and the number of backbone nodes. A requirement is composed of a source backbone node and a destination backbone node as well as the magnitude in bytes/second of the traffic being transmitted between them. The input for each requirement must include its source and destination backbone node pair and its magnitude. The input for each link must contain the backbone nodes at which it begins and ends; the physical length of the link and its cost, including costs associated with the endpoints; the link speed, which is the capacity of a single channel in bytes/seconds; and the multiplicity, which is the number of parallel channels between a source and a destination. Each link is treated as unidirectional.

The output of this system are near-optimal routes. The output data includes each route's source backbone node, destination backbone node, the magnitude of the traffic on each route, the index (link number) of another route for the same requirement, and the index into a vector containing all links in all routes. The index of a route for each requirement is also produced. For each link, the total flow of traffic is given in bytes/second.

This system allows the user to evaluate the performance of a particular network design or routing pattern. It also allows the user to investigate the effects of changing the levels of traffic as well as the parameters used in the traffic delay model. The results from this system can be displayed interactively and reports can be generated for network-wide information purposes. The output from this system can also be fed directly into other systems that are used to design distributed data communications networks, allowing design alternatives to be better evaluated.

The above is a brief discussion of some of the prior art and features of the invention. Other advantages of the invention can be gleaned from the detailed discussion of the preferred embodiment that follows.

BRIEF DESCRIPTION OF THE DRAWINGS

FIG. 4 shows the input data of FIG. 3 in tabular form.

FIG. 5 is an output table showing the routing information.

FIG. 6 is an output table showing the link delay data.

DETAILED DESCRIPTION

Figure 1:
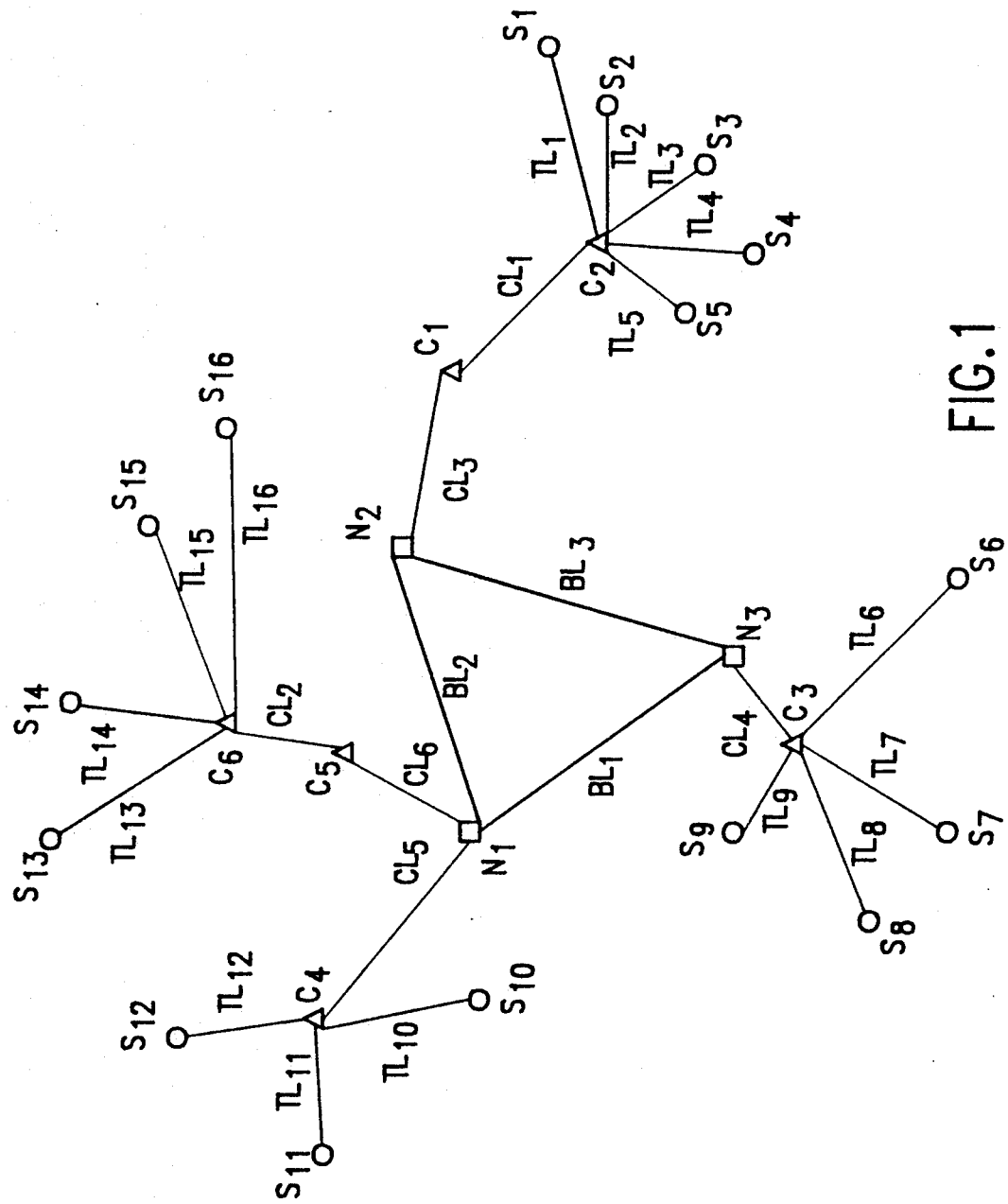
FIG. 1 is a schematic diagram depicting a distributed data communications network, which includes backbone nodes, concentrators, and traffic sources, as well as the data link lines between them.

An example of a distributed data communications network is shown in FIG. 1. The network is depicted as a set of interconnected data terminals $S_1$-$S_{16}$. The terminals are connected to concentrators $C_1$-$C_6$ such as Telenet Communications Corporation model number TP 3000 series multiplexers. The concentrators are in turn connected to backbone nodes $N_1$-$N_3$, which contain data switches such as a Telenet Communications Corporation TP4/III series switch. The traffic sources $S_1$-$S_{16}$ are connected to the concentrators $C_1$-$C_6$ by data link lines $TL_{1-15}$ that are leased from the local telephone service providers. The concentrators $C_1$-$C_6$ may be connected to other concentrators $C_1$-$C_6$ by data link lines $CL_1$-$CL_6$, or, the concentrators can be connected directly to the backbone nodes by data links $CL_3$-$CL_6$. Both of these types of lines are leased from local telephone service providers. The backbone nodes $N_1$-$N_3$ are connected together by backbone data lines $BL_1$-$BL_3$, which are high-volume leased data lines. The invention is a method for determining near-optimal routes for the flow of data between the clusters at the backbone level, given a traffic matrix and the backbone topology.

The hardware components shown schematically in FIG. 1 can represent a variety of hardware devices. Each terminal $S_1$ represents either a physical user terminal, or a virtual terminal composed of an aggregate of more than one physical terminal. In general, a single physical location may have more than one hardware device.

The method of the present invention is a variation of a method by Bertsekar and Gallager. In the first step of the method, a length is assigned to each link which is based on its congestion and the delay of the traffic through it rather than simply its physical length. Specifically, the length of each link is based on the derivative of the traffic delay through the link with respect to the flow through the link. The flow is the amount of traffic being transmitted in bytes/second. Using these link lengths, the shortest routes between all pairs of backbone nodes are determined. For each requirement, flow is diverted from all other routes to the shortest route which meets that requirement.

The amount of flow Dxp, diverted from route p is given by:

$$Dxp = min\ (xp,\ AHp-1[dp-ds])$$

where xp is the amount of requirement currently allocated to route p, dp is the length of route p, ds is the length of the shortest path, Hp-1 is a correction factor based on an estimate of the second derivative of the delay with respect to flow, and A is the step size, as used in the method of steepest descent.

The slack S, defined as the minimum spare capacity on any link in the path, is determined for the shortest path. If Dxp exceeds S/N, where N is the number of nodes, Dxp is set equal to S/N. By equating these two terms, the method of the invention is stabilized for circumstances where the link utilization is very high. Under other circumstances, it has very little effect.

The model that determines the link delay, which in turn is used to determine the length of the links, in given by the expression:

$$D1 = A1f1/(C1-f1) + B1$$

The parameter A1 is based on the packet transmission time on link 1, f1 is the flow in link 1, C1 is the capacity of link 1, and B1 is a parameter based on the fixed delay in the link which includes modem delay, propagation delay, and half the average nodal delay, as well as any other factors the user may wish to include. By increasing B1, min-hop routes can be simulated. The larger B1 becomes, the more closely min-hop routing is approached.

After the flow for each requirement is diverted to the shortest path, the entire procedure is repeated. The length of the links and the shortest routes are re-determined. Based on this information, flow is again diverted to the shortest route and the slack is recalculated. This iterative procedure is continued until no further progress is made as defined by a threshold parameter. This threshold parameter is the step size A, which is a parameter used to determine the amount of flow to be diverted from a given route, as shown in the equation above. In order to continue the iterative process, the step size is halved. This procedure continues until the step size is reduced to some predetermined value.

Additional parameters can also be specified which provide overhead factors on the link capacity and flow. These parameters allow the link to be more accurately modeled and allows the use of the most heavily utilized link to be minimized. This minimization is accomplished by increasing the overhead, which forces flow away from the most heavily utilized links. The overhead is the capacity in bits per second that must be retained for purposes other than the transmission of the user's data.

The overhead can be increased in two ways. One, the parameter specifying the percent link overhead on all links can be increased. Alternatively, a parameter that directly specifies the amount of overhead can be increased. This increase minimizes the amount of spare capacity on the most heavily utilized links. The method of Bertsekar and Gallager has been modified so that small step sizes can be used. This modification allows the system to function reliably even with links that are highly utilized, which could not be done with the original method.

The parameters of this method that are controlled by the user are as follows: The maximum link utilization, which extends with a linear term the link delay in the link delay model past this point; the delay tolerance, which defines the fractional improvement that the optimization method accepts as progress after an iteration is complete; the initial and minimum step sizes; the packet length in bytes; the average nodal delay in seconds; and the additional per node delay in seconds, which is used to induce min-hop routing.

The steps of the method will now be presented in greater detail in the order in which they are executed. The primary steps are illustrated in FIG. 2.

Figure 2:
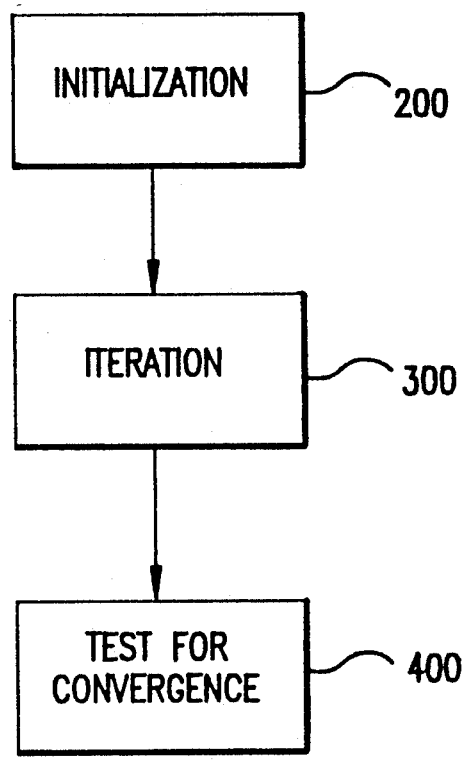
FIG. 2 is a flow diagram illustrating the primary steps of the present invention.

The first step is the initialization of the method, as indicated by block 200 in FIG. 2. During this step, the following substeps are carried out:

1) The step size is set to an initial value.
2) The sum of all requirements is computed.
3) The link length is set to its initial value, which is based on the derivative of the delay with respect to the flow. Initially, the flow is zero.
4) The shortest routes between all the pairs of nodes are determined.
5) The requirements are placed onto these routes, thus providing the initial global flows on the network.
6) The shortest routes just determined are stored.
7) The current delay is set to the delay in the current flow.
8) Set the previous delay to a large number.

The second step performs the iteration, as indicated by block 300 in FIG. 2. During this step, the following substeps are carried out:

1) The link length is set to the derivative of the delay with respect to the current value of the flow.
2) The shortest routes between all the pairs of nodes is determined.
3) The requirements are placed onto these routes, providing the current flow pattern.
4) The current shortest routes are stored.
5) An approximation of the second derivative of the path length is determined.
6) The amount of slack on each of the shortest routes is determined.
7) The flow is re-routed from all other routes onto the shortest routes, based on the values of the first derivative, the second derivative, and the slack.

8) The new global flows are determined.

9) The new delay for the current global flow pattern is determined.

The third step tests for convergence, as indicated by block 400 in FIG. 2. During this step, the following substeps are carried out:

1) The current value of the delay is compared to its previous value. If the current delay is the smaller of the two values the iteration process is continued by calculating new link lengths.

2) If the current step size is larger than the minimum step size, the step size is halved and the iteration process continues. If the current step size is equal to the minimum step size, the method is terminated and the shortest routes are reported.

Figure 3:
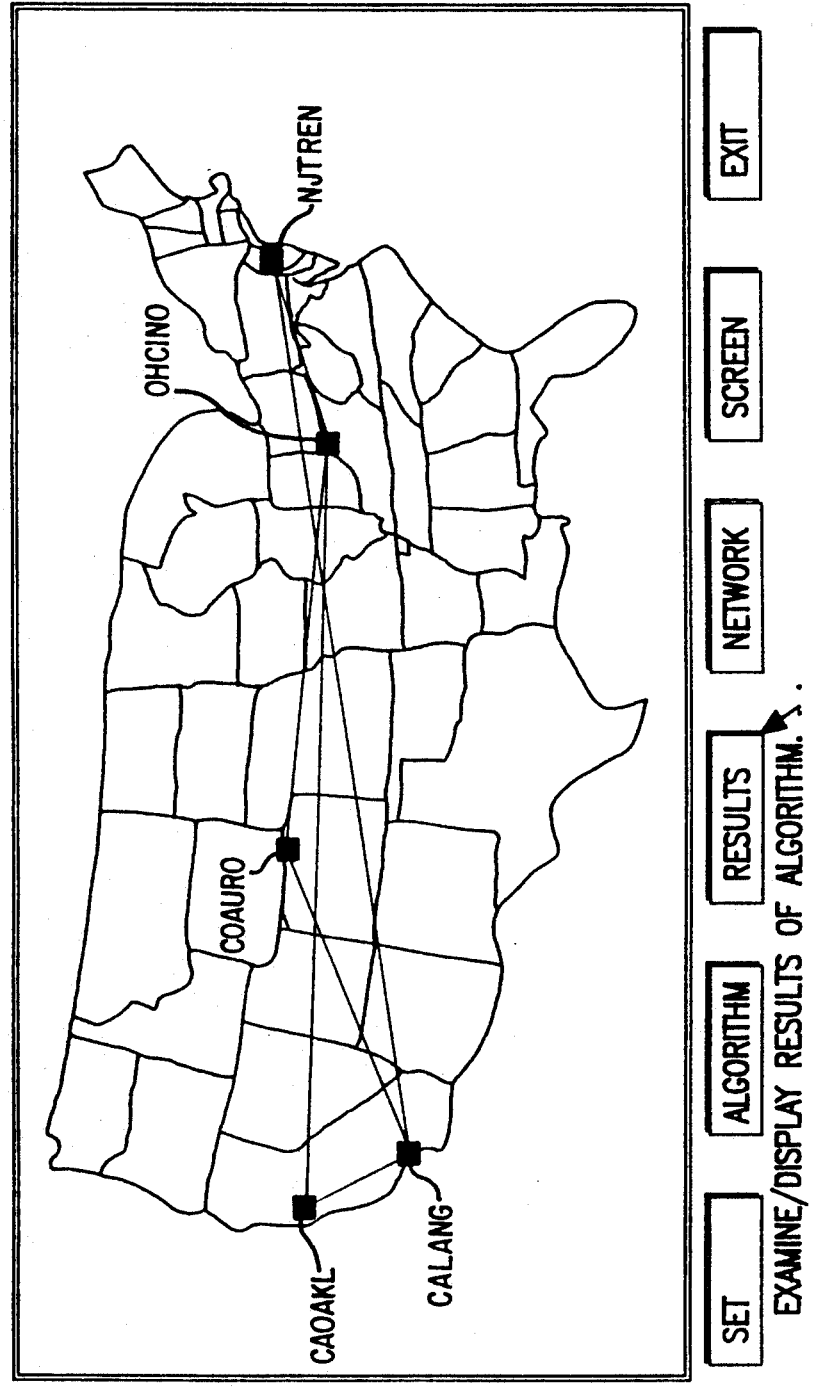
FIG. 3 is a map showing the locations of the backbone sites that are used as input.

FIG. 3 is a map showing the locations of the backbone sites used as input and FIG. 4 shows this input data in tabular form. A sample output resulting from the method of the invention is shown in FIGS. 5 and 6. FIG. 5 includes the routing information and FIG. 6 includes the link delay data.

The preferred embodiment of the invention described above represents one desirable, workable embodiment of the invention. It is to be understood that the methodology described herein is not limited to specific forms disclosed by way of example and illustration, but may assume other embodiments and methods limited only by the scope of the appended claims and their equivalents.

What is claimed is:

1. A method for constructing a data communication network having:
   a) a backbone including
      i) backbone nodes for routing data traffic within sad backbone, and
      ii) a plurality of first links for connecting said backbone nodes,
   b) terminals;
   c) concentrators;
   d) a plurality of second links for connecting said terminals with said concentrators; and
   e) a plurality of third links for connecting said concentrators with said backbone nodes, wherein each of said first, second, and third links has an associated traffic delay time and data flow,
   comprising the steps of:
   1) assigning a length of each of said plurality of first links based on a derivative of traffic delay time with respect to the data flow;
   2) determining the shortest routes between each pair of said backbone nodes;
   3) placing requirements corresponding to a current data flow pattern onto said shortest routes;
   4) storing said shortest routes;
   5) determining an approximation of a second derivative of traffic delay time with respect to data flow;
   6) determining an amount of slack on each of said shortest routes;
   7) rerouting said data flow from all other routes onto said shortest routes based on said first derivative, said second derivative, and said slack;
   8) determining an updated data flow of the network; and
   9) determining an updated traffic delay time for the updated data flow of the network.

2. The method for constructing a data communication network according to claim 1 further comprising repeating the steps (1) through (9) and selecting for operation the network having a network data flow which incurs a minimum traffic delay time.

3. The method according to claim 1 for constructing a data communication network wherein the concentrators are statistical multiplexers with protocol conversion capabilities.

4. The method according to claim 1 for constructing a data communication network wherein said backbone nodes include data switches.

5. The method for constructing a data communication network according to claim 1 wherein said second links are data lines of telephone service providers.

6. The method for constructing a data communication network according to claim 1 wherein said first links are high volume data lines.

7. The method for constructing a data communication network according to claim 6 wherein said high volume data lines are fiber optic lines.

8. A computer system for constructing a data communication network having:
   a) a backbone including,
      i) backbone nodes for routing data traffic within said backbone, and
      i) a plurality of first links for connecting said backbone nodes,
   b) terminals;
   c) concentrators;
   d) a plurality of second links for connecting said terminals with said concentrators; and
   e) a plurality of third links for connecting said concentrators with said backbone nodes, wherein each of said first, second and third links has an associated traffic delay time and data flow,
   said computer system comprising:
   1) means for assigning a length of each of said plurality of first links based on a derivative of traffic delay time with respect to the data flow;
   2) means for determining the shortest routes between each pair of said backbone nodes;
   3) means for placing requirements corresponding to a current data flow pattern onto said shortest routes;
   4) means for storing said shortest routes;
   5) means for determining an approximation of a second derivative of traffic delay time with respect to data flow;
   6) means for determining an amount of slack on each of said shortest routes;
   7) means for rerouting said data flow from all other routes onto said shortest routes based on said first derivative, said second derivative, and said slack;
   8) means for determining an updated data flow of the network; and
   9) means for determining an updated traffic delay time for the updated data flow of the network.

9. The computer system according to claim 8 for constructing a data communication network wherein the concentrators are statistical multiplexers with protocol conversion capabilities.

10. The computer system according to claim 8 for constructing a data communication network wherein said backbone nodes include data switches.

11. The computer system for constructing a data communication network according to claim 8 wherein said second links are data lines of telephone service providers.

12. The computer system for constructing data communication network according to claim 8 wherein said first links are high volume data lines.

13. The computer system for constructing a data communication network according to claim 12 wherein said high volume data lines are fiber optic lines.

14. A method for constructing a data communication network having,
   a) a backbone including,
      i) a plurality of first links for connecting said backbone nodes,
   b) terminals;
   c) concentrators;
   d) a plurality of second links for connecting said terminals with said concentrators; and
   e) a plurality of third links for connecting said concentrators with said backbone nodes, and having an associated traffic delay and data flow,
comprising steps of:
   (1) assigning a length of each of said plurality of first links based on a derivative of traffic delay time with respect to the data flow;
   (2) determining the shortest routes between each pair of said backbone nodes;
   (3) assigning at least one requirement to each route;
   (4) diverting flow from other routes to the shortest route which meets each of the assigned requirements;
   (5) determining a slack value based on a minimum spare capacity of any link in the route;
   (6) determining a correction factor based on an estimate of the second derivative of traffic delay with respect to flow, for each link;
   (7) determining the amount of diverted flow based on the requirements assigned to each route, a step size, said correction factor, the length of the route and the length of the shortest path, for each route;
   (8) setting the amount of diverted flow equal to the slack value divided by the number of nodes when the amount of diverted flow is greater than the slack value divided by the number of nodes;
   (9) determining a link delay for each link;
   (10) determining a length of each link based on said link delay; and
   (11) repeat steps (1) through (10) until change in length is less than said step size.

* * * * *

UNITED STATES PATENT AND TRADEMARK OFFICE
CERTIFICATE OF CORRECTION

PATENT NO. : 5,253,161            Page 1 of 2
DATED : October 12, 1993
INVENTOR(S) : Paul Nemirovsky et al It is certified that error appears in the above-indentified patent and that said Letters Patent is hereby corrected as shown below:

| Column | Line | |
|---|---|---|
| 2 | 63 | Change "$CL_1-CL_6$" to --$CL_1-CL_2$--. |
| 5 | 35 | Change "sad" to --said--. |
| 6 | 24 | Change "i" to --ii)--. |
| 7 | 6-7 | Insert --i) backbone nodes for routing traffic within said backbone, and--. |
| 7 | 7 | Change "i" to --ii)--. |
| 7 | 8 | After "nodes" insert --and having an associated traffic delay and data flow--. |
| 7 | 12 | After "and" insert --having an associated traffic delay and data flow,--. |
| 7 | 17 | After "length" change "of" to --to--. |

UNITED STATES PATENT AND TRADEMARK OFFICE
CERTIFICATE OF CORRECTION

PATENT NO. : 5,253,161
DATED : October 12, 1993
INVENTOR(S) : Paul Nemirovsky et al It is certified that error appears in the above-indentified patent and that said Letters Patent is hereby corrected as shown below:

| Column | Line | |
|---|---|---|
| 7 | 18 | After "of" insert --the--; after "delay" insert --through the link with respect to the flow through the link;--; delete "time". |
| 7 | 19 | Delete "with respect to the data flow;". |

Signed and Sealed this

Third Day of May, 1994

*Attest:*

BRUCE LEHMAN

*Attesting Officer*   Commissioner of Patents and Trademarks